United States Patent
Tan et al.

(10) Patent No.: US 10,003,930 B2
(45) Date of Patent: Jun. 19, 2018

(54) METHOD, APPARATUS AND SYSTEM FOR PROCESSING TRUNKED SERVICE ATTRIBUTE

(71) Applicant: Beijing Xinwei Telecom Technology Inc., Beijing (CN)

(72) Inventors: Yuanchun Tan, Beijing (CN); Wei Zheng, Beijing (CN); Wenzhong Zhang, Beijing (CN); Qian Li, Beijing (CN)

(73) Assignee: Beijing Xinwei Telecom Technology Inc., Beijing (CN)

( * ) Notice: Subject to any disclaimer, the term of this patent is extended or adjusted under 35 U.S.C. 154(b) by 0 days. days.

(21) Appl. No.: 15/310,857

(22) PCT Filed: Dec. 5, 2014

(86) PCT No.: PCT/CN2014/093092
§ 371 (c)(1),
(2) Date: Nov. 14, 2016

(87) PCT Pub. No.: WO2015/081880
PCT Pub. Date: Jun. 11, 2015

(65) Prior Publication Data
US 2017/0127248 A1    May 4, 2017

(30) Foreign Application Priority Data
Dec. 7, 2013 (CN) .......................... 2013 1 0676976

(51) Int. Cl.
*H04M 3/42* (2006.01)
*H04W 4/06* (2009.01)
(Continued)

(52) U.S. Cl.
CPC ............. *H04W 4/06* (2013.01); *H04W 8/186* (2013.01); *H04W 8/24* (2013.01); *H04W 76/021* (2013.01); *H04W 84/08* (2013.01)

(58) Field of Classification Search
CPC ........ H04W 4/06; H04W 8/186; H04W 84/08
(Continued)

(56) References Cited

U.S. PATENT DOCUMENTS

2009/0180414 A1*  7/2009  Maeda ................. H04B 7/2643
                                                          370/311
2012/0236737 A1*  9/2012  Bergman .......... H04W 74/0833
                                                          370/252
2012/0294694 A1* 11/2012  Garot ..................... F27D 1/141
                                                          411/427

FOREIGN PATENT DOCUMENTS

| CN | 102111829 A | 6/2011 |
| CN | 102137337 A | 7/2011 |
| CN | 103108285 A | 5/2013 |

OTHER PUBLICATIONS

Pub-No. No. CN102123460A or Appl-No. CN 201010033951 A, Yuping Yan, Method for realizing group calling service handover in trunked mobile communication system, Jul. 13, 2011.*
(Continued)

*Primary Examiner* — Nghi H Ly
(74) *Attorney, Agent, or Firm* — Marshall, Gerstein & Borun LLP

(57) ABSTRACT

The present invention provides a method for processing a trunked service attribute, which includes: after a User Equipment (UE) enters a Radio Resource Control Connected (RRC_Connected) state and when a trunked called service is operated on the UE, informing, by the UE, a base station of a trunked service attribute.

8 Claims, 3 Drawing Sheets

(51) Int. Cl.
*H04W 8/24* (2009.01)
*H04W 8/18* (2009.01)
*H04W 76/02* (2009.01)
*H04W 84/08* (2009.01)

(58) Field of Classification Search
USPC .......................... 455/416, 518, 414.1, 422.1
See application file for complete search history.

(56) References Cited

OTHER PUBLICATIONS

Search Report in International Application No. PCT/CN2014/093092 dated Mar. 10, 2015, 4 pages.

* cited by examiner

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Fig. 1

| Index | LCID values |
|---|---|
| 00000 | CCCH |
| 00001-01010 | Identity of the logical channel |
| 01011-10111 | Reserved |
| 11000 | G-RNTI |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Fig. 2

METHOD, APPARATUS AND SYSTEM FOR PROCESSING TRUNKED SERVICE ATTRIBUTE

This application claims the benefit and priority of Chinese Patent Application No. 201310676976.6, filed on Dec. 7, 2013 and entitled "METHOD, APPARATUS AND SYSTEM FOR PROCESSING TRUNKED SERVICE ATTRIBUTE", the entire content of which is hereby incorporated by reference.

TECHNICAL FIELD

The present disclosure relates to communication technologies, and more particularly to a method, apparatus and system for processing a trunked service attribute.

BACKGROUND

In a radio trunked communication system, for a specific group call, a base station does not know which User Equipments (UEs) in a cell receive the group call. That is, the base station is hard to know whether the UEs can receive the group call.

SUMMARY

The present disclosure provides a method for processing a trunked service attribute, which includes:

after a UE enters a Radio Resource Control Connected (RRC_Connected) state and when a trunked called service is operated on the UE, informing, by the UE, a base station of a trunked service attribute.

The present invention also provides a UE for processing a trunked service attribute, which includes:

a reporting module, configured to, after the UE enters a Radio Resource Control Connected (RRC_Connected) state and when a trunked called service is operated on the UE, inform a base station of a trunked service attribute.

The present invention also provides a method for processing a trunked service attribute, which includes:

receiving, by a base station, a message containing a trunked service attribute reported by a UE, and obtaining the trunked service attribute of the UE according to the message.

By the present invention, it can be learned whether a trunked called service is operated on a UE entering an RRC_Connected state in a cell even if air interface signalings at a base station side are not increased, so that the base station is able to accurately know which UEs can receive a group call in the cell.

BRIEF DESCRIPTION OF THE DRAWINGS

FIG. 1 is a diagram illustrating a LCID list of a LTE UL-SCH channel.

FIG. 2 is a diagram illustrating a LCID list of a G-RNTI according to some embodiments of the present invention.

DETAILED DESCRIPTION

Figure 3:
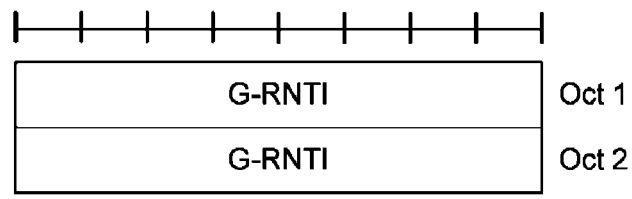
FIG. 3 is a diagram illustrating the structure of a G-RNTI MAC CE according to some embodiments of the present invention.

In order to make the object, technical solution and merits of the present invention clearer, the present invention will be illustrated in detail hereinafter with reference to the accompanying drawings. It should be noted that, in case of no conflict, the embodiments and the technical features of the present invention can be arbitrarily combined.

At present, a solution is to allow a base station to learn relevant information from a network side. For example, the base station may learn directly from the network side whether a UE having an individual service to be scheduled belongs to a group call; or the base station may learn from the network side all UEs receiving the group call, then monitors a UE having an individual service to be scheduled in a cell and judges whether the UE belongs to the group call. By the above solution, the base station can learn a trunked service attribute, but the processing complexity and maintenance difficulty of the network side is increased. Therefore, the present invention provides a method for processing a trunked service attribute, by which the processing complexity of the network side is not increased.

The method provided by the present invention may be implemented as follows.

At UE side, after a UE enters a Radio Resource Control Connected (RRC_Connected) state and when a trunked called service is operated on the UE, the UE informs a base station of a trunked service attribute. The trunked service attribute includes, but is not limited to, a Group Identifier (GroupID) or a Group Radio Network Temporary Identifier (G-RNTI). The UE may inform the base station of the G-RNTI of the trunked service through a G-RNTI Media Access Control (MAC) Control Element (CE) or a Cell Radio Network Temporary Identifier (C-RNTI) MAC CE. Specifically, in following conditions, the UE may inform the base station of the G-RNTI of the trunked service through the G-RNTI MAC CE. When the UE is in the RRC_Connected state in a current uplink Transmit Time Interval (TTI) and the trunked service attribute includes the G-RNTI, the UE may report the G-RNTI to the base station through the G-RNTI MAC CE. When the UE is in the RRC_Connected state in the current TTI, the trunked service attribute includes the G-RNTI and the UE has no C-RNTI to be reported, the UE may report the G-RNTI to the base station through the C-RNTI MAC CE. When the UE is in the RRC_Connected state in the current TTI, the trunked service attribute includes the G-RNTI and the UE has a C-RNTI to be reported, the UE may report the C-RNTI to the base station through the C-RNTI MAC CE first. Until there is no C-RNTI to be reported, the UE reports the G-RNTI to the base station through the C-RNTI MAC CE. The GroupID of the trunked service may be reported to the base station via a Dedicated Control Channel (DCCH) through newly adding an RRC signaling such as TrunkInfoReport or through extending an original RRC signaling (i.e. adding a GroupID field into the original RRC signaling). In this embodiment, the original RRC signaling is indicated by OrialRRCInfo. Specifically, when the UE is in the RRC_Connected state in the current uplink TTI and the trunked service attribute includes the GroupID, the UE reports the GroupID to the base station through TrunkInfoReport or OrialRRCInfo.

At a base station side, the base station receives a message containing a trunked service attribute reported by the UE, and obtains the trunked service attribute of the UE. In an embodiment, the base station receives the G-RNTI MAC CE from the UE, parses out the G-RNTI, and determines that a trunked called service corresponding to the G-RNTI is operated on the UE. In another embodiment, the base station receives the C-RNTI MAC CE from the UE, and compares a parsed-out value with a C-RNTI corresponding to the UE. If the parsed-out value is different from the C-RNTI corresponding to the UE, the base station determines that a trunked called service corresponding to the parsed-out value is operated on the UE. If the parsed-out value is the same as the C-RNTI corresponding to the UE, the base station determines that no trunked called service is operated on the UE. The base station receives a TrunkInfoReport signaling or a GroupID field in an OrialRRCInfo signaling from the UE to get the GroupID of the trunked service of the UE.

According to a first embodiment, a method for increasing a G-RNTI MAC CE is described.

A Logic Channel Identifier (LCID) of a Long Term Evolution (LTE) Uplink Shared Channel (UL-SCH) channel is shown in FIG. 1. In an embodiment, a LCID of a G-RNTI may be set to 11000, as shown in FIG. 2.

The G-RNTI MAC CE has a fixed length, i.e., 16 bits, and may carry the G-RNTI of a trunked called service of a UE, as shown in FIG. 3.

A second embodiment is described as follows.

In this embodiment, the trunked called service is operated on the UE. When the trunked called service starts to be operated on the UE, an individual service is operated on the UE. In an embodiment, it is supposed that a C-RNTI of a UE is 10, the G-RNTI of the trunked called service is 23 and the UE reports the G-RNTI through the G-RNTI MAC CE. The G-RNTI MAC CE may refer to that described in the first embodiment.

At UE side, when UE 4_1 determines that it is in a Radio Resource Control Idle (RRC_Idle) state in a current uplink TTI and only has a G_RNTI, the UE does not report the G_RNTI.

When UE 4_2 determines that it is in the RRC_Connected state in the current uplink TTI and has both a C_RNTI and a G-RNTI, the UE reports the G-RNTI of the trunked called service to a base station cell in the uplink TTI through the G-RNTI MAC CE. For example, the G-RNTI of the trunked called service is 23.

At base station side, the base station cell receives the G-RNTI MAC CE data of the UE in the current uplink TTI, parses out the G-RNTI, i.e., 23, and determines that a trunked called service of which G-RNTI is 23 is operated on the UE.

A third embodiment is described as follow.

An individual service is operated on the UE. When the individual service starts to be operated on the UE, the trunked called service is operated on the UE. In an embodiment, it is supposed that a C-RNTI of the UE is 129, the G-RNTI of the trunked called service is 58 and the UE reports the G-RNTI through the C-RNTI MAC CE.

At UE side, when UE 5_1 determines that it is in the RRC_Connected state in the current uplink TTI and has a G_RNTI, the UE does not report the G_RNTI.

When UE 5_2 determines that it is in the RRC_Connected state in the current uplink TTI and has both a C_RNTI and a G-RNTI, the UE reports the G-RNTI of the trunked called service to the base station cell in the uplink TTI through the G-RNTI MAC CE. For example, the G-RNTI of the trunked called service is 23.

At the base station side, the base station cell receives the G-RNTI MAC CE data of the UE in the current uplink TTI, parses out the G-RNTI, i.e., 23, and determines that a trunked called service of which G-RNTI is 23 is operated on the UE.

According to a fourth embodiment, an RRC signaling TrunkInfoReport is newly added.

In an embodiment, a format of the RRC signaling TrunkInfoReport is described as follows.

```
TrunkInfoReport ::= SEQUENCE {
    group-ID           TGID
}
TGID ::=               SEQUENCE (SIZE (11)) OF BCD-Digit
BCD-Digit ::=          INTEGER (0..9)
```

A fifth embodiment is described as follows.

An individual service is operated on the UE. After the individual service starts to be operated on the UE, the trunked called service is operated on the UE. In an embodiment, it is supposed that a C-RNTI of the UE is 129, the GroupID of the trunked called service is 428, the G-RNTI is 58 and the UE reports a GroupID through TrunkInfoReport.

At the UE side, when the UE determines that it is in the RRC_Connected state in the current uplink TTI and has no GroupID, the UE does not report the GroupID.

When the UE determines that it is in the RRC_Connected state in the current uplink TTI and has the GroupID, the UE reports the GroupID of the trunked called service to the base station cell in the uplink TTI through TrunkInfoReport.

At the base station side, the base station receives TrunkInfoReport from the UE, obtains the GroupID of the trunked called service of the UE, i.e., 428, and then determines that a trunked called service of which GroupID is 428 is operated on the UE.

A sixth embodiment is described as follows.

The present invention also provides a UE for processing a trunked service attribute, which includes a reporting module. When the UE is in an RRC_Connected state and a trunked called service is operated on the UE, the reporting module reports a trunked service attribute to a base station. The trunked service attribute includes, but is not limited to, a GroupID or a G-RNTI. The reporting module may inform the base station of the G-RNTI of the trunked service through a G-RNTI MAC CE or a C-RNTI MAC CE. The reporting module may also inform the base station of a GroupID of the trunked service through newly adding an RRC signaling or extending an original RRC signaling.

When the UE is in the RRC_Connected state in a current uplink TTI and has a G-RNTI, the reporting module reports the G-RNTI to the base station through the G-RNTI MAC CE.

When the UE is in the RRC_Connected state in the current uplink TTI, has a G-RNTI and has no C-RNTI to be reported, the reporting module reports the G-RNTI to the base station through the C-RNTI MAC CE. When the UE is in the RRC_Connected state in the current uplink TTI, has a G-RNTI and has a C-RNTI to be reported, the reporting module reports the C-RNTI to the base station through the C-RNTI MAC CE first. Until there is no C-RNTI to be reported, the UE reports the G-RNTI to the base station through the C-RNTI MAC CE.

A seven embodiment is described as follows.

The present invention also provides a base station for processing a trunked service attribute, which includes a receiving module, configured to receive a message containing a trunked service attribute reported by a UE, and obtain the trunked service attribute of the UE. Specifically, the receiving module receives a G-RNTI MAC CE from the UE. When parsing out a G-RNTI, the base station determines that a trunked called service corresponding to the G-RNTI is operated on the UE. Or, the receiving module receives a C-RNTI MAC CE from the UE, and the base station compares a parsed-out value with a C-RNTI corresponding to the UE. If the parsed-out value is different from the C-RNTI corresponding to the UE, the base station determines that a trunked called service corresponding to the parsed-out value is operated on the UE. If the parsed-out value is the same as the C-RNTI corresponding to the UE, the base station determines that no trunked called service is operated on the UE. Or, the receiving module receives a TrunkInfoReport signaling or a GroupID field in a TrunkInfoReport signaling from the UE, and then obtains the GroupID of the trunked service of the UE.

The present invention also provides a system for processing a trunked service attribute, which includes the UE and the base station as described above.

Figure 4:
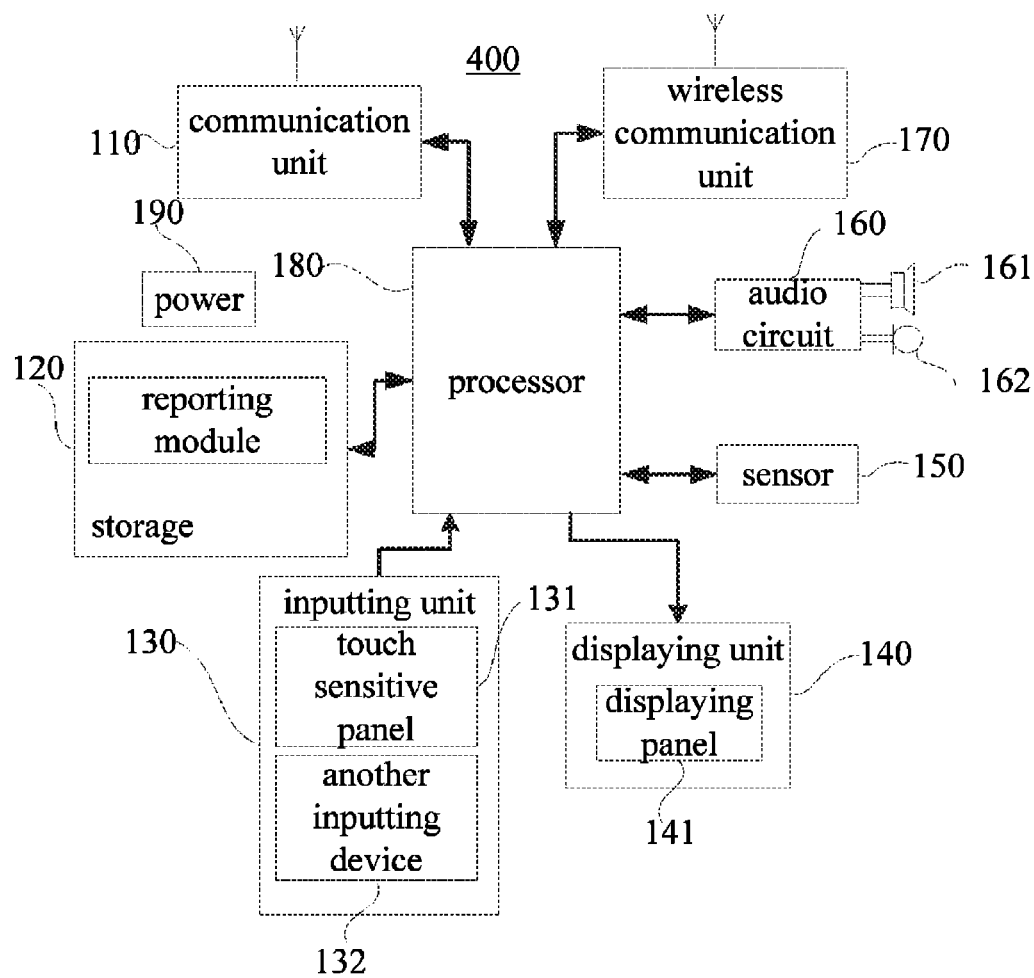
FIG. 4 is a diagram illustrating the structure of a UE for processing a trunked service attribute according to some embodiments of the present invention.

FIG. 4 is a diagram illustrating the structure of a UE for processing a trunked service attribute according to some embodiments of the present invention. Referring to FIG. 4, a sending apparatus may be configured to implement a service sending method provided by the above embodiments.

A UE 400 may include: a communication unit 110, including one or more non-transitory storages 120 used as a computer readable storage medium, an inputting unit 130, a displaying unit 140, a sensor 150, an audio circuit 160, a wireless communication unit 170, one or more processors 180 and a power 190. The wireless communication unit 170 may be a Wireless Fidelity (WiFi) module. The skilled in the art can understand that the sending apparatus is not limited by the structure of the sending apparatus shown in FIG. 4, but can include more or less components than components in the structure shown in FIG. 4, or can combine some components in the structure shown in FIG. 4, or can have a component arrangement different from the component arrangement in the structure shown in FIG. 4.

The communication unit 110 may transmit and receive signals during an information transmitting and receiving process or a call process. The communication unit 110 may be a network communication device such as a Radio Frequency (RF) circuit, a router, a modem and so on. Particularly, when the communication unit 110 is the RF circuit, the communication unit 110 may receive downlink information from a base station and transmit the downlink information to the one or more processors 180. In addition, the communication unit 110 may transmit uplink data to the base station. Usually, the RF circuit used as the communication unit includes, but is not limited to, an antenna, at least one amplifier, a tuner, one or more oscillators, a Subscriber Identity Module (SIM) card, a transceiver, a coupler, a Low Noise Amplifier (LNA), a duplexer etc. In addition, the communication unit 110 may also communicate with a network and other communication devices through wireless communication. Any of communication standards or protocols may be used in the wireless communication, which include Global System of Mobile communication (GSM), General Packet Radio Service (GPRS), Code Division Multiple Access (CDMA), Wideband Code Division Multiple Access (WCDMA), Long Term Evolution (LTE), Email, Short Messaging Service (SMS) etc.

The storage 120 may store software programs and modules, and the processor 180 may operate the software programs and modules stored in the storage 120 to implement a variety of functional applications and data processing. The storage 120 may include: a program storage area and a data storage area. The program storage area may store an operation system and an application program for implementing at least one function (e.g., an audio playing function, a video playing function and so on). The data storage area may store data created when the UE 400 is used (e.g., audio data, contact data and so on). In addition, the storage 120 may include a high-speed random access memory and a non-transitory memory such as at least one disk storage device, flash device or a transitory solid-state storage device. Accordingly, the storage 120 may also include a storage controller to provide the access to the storage 120 for the processor 180 and the inputting unit 130. In the embodiment of the present invention, the storage 120 may store the above reporting module.

The inputting unit 130 may receive inputted numeral or character information, and generate signal input of a keyboard, a mouse, an operating lever, an optics or a trackball related with user configuration and function control. Specifically, the inputting unit 130 may include a touch sensitive panel 131 and another inputting device 132. The touch sensitive panel 131 is also called a touch screen or a touch pad, and may collect a touch operation performed by a user on or near the touch sensitive panel 131 (e.g., the user performs an operation on or near the touch panel 131 with any suitable object or accessory such as a finger and a touchpen), and drive a connection device according to a preset program. The touch sensitive panel 131 may include a touch detection apparatus and a touch controller. The touch detection apparatus may detect a touch position of the user, detect a signal generated based on the touch operation, and transmit the signal to the touch controller. The touch controller may receive touch information from the touch detection apparatus, convert the touch information into a touch point coordinate, transmit the touch point coordinate to the processor 180, and receive and execute a command sent by the processor 180. In addition, the touch sensitive panel 131 may be implemented by multiple modes such as a resistive mode, a capacitive mode, an infrared mode or a surface acoustic wave mode. Besides the touch sensitive panel 131, the inputting unit 130 may further include another inputting device 132. Specifically, the inputting device 132 may include, but is not limited to, at least one of a physical keyboard, a function key (such as a volume control key, a switch key etc.), a trackball, a mouse and an operating lever.

The displaying unit 140 may display information inputted by the user or information provided to the user and various graphical user interfaces of the UE 400. The graphical user interfaces may be constructed by graphics, texts, icons, videos, and any combination thereof. The displaying unit 140 may include a displaying panel 141, which may be configured by a Liquid Crystal Display (LCD) and an Organic Light-Emitting Diode (OLED). Furthermore, the touch sensitive panel 131 may be covered with the displaying panel 141. When detecting the touch operation on or near the touch sensitive panel 131, the touch sensitive panel 131 transmits the touch operation to the processor 180 to determine the type of the touch event. Afterwards, the processor 180 provides a video output on the displaying panel 141 according to the type of the touch event. Although the touch sensitive panel 131 and the displaying panel 141 are used as two independent components to implement an inputting function and an outputting function respectively in FIG. 4, in some examples, the touch sensitive panel 131 and the displaying panel 141 may be integrated to implement the inputting function and the outputting function.

The sensor 150 may include: a light sensor, a motion sensor and another sensor. The light sensor may include an ambient light sensor and a proximity sensor. The ambient light sensor may adjust the brightness of the displaying panel 141 according to the brightness of ambient light. The proximity sensor may close the displaying panel 141 and/or become backlit when the UE 400 is moved to an ear. As one kind of motion sensor, a gravity accelerometer sensor can detect a value of acceleration on all directions (typically three-axis). The gravity accelerometer sensor may detect the value and direction of gravity in stationary, identify a posture of a mobile phone (such as switch between a horizontal screen and a vertical screen, a related game, magnetometer posture calibration and so on), and implement a vibration recognition related function (such as a pedometer and a percussion). Another sensor such as a gyroscope, a barometer, a hygrometer, a thermometer and an infrared sensor may be configured in the UE 400.

The audio circuit 160, the speaker 161 and the microphone 162 may provide an audio interface between the user and the UE 400. The audio circuit 160 may transmit to the speaker 161 an electric signal transformed from received audio data. The speaker 161 transforms the electric signal to a sound signal and outputs the sound signal. On the other hand, the microphone 162 transforms the collected sound signal to an electric signal. The audio circuit 160 receives the electric signal, transforms the electric signal to audio data, and outputs the audio data to the processor 180. After the audio data is processed by the processor 180, the audio data is transmitted to a receiving device via the RF circuit 110, or is outputted to the storage 120 for further processing. The audio circuit 160 may also include a headset jack to provide communication between peripheral headset and the UE 400.

The wireless communication unit 170 may be a WiFi module. The WiFi module is based on a short-range wireless transmission technology. The user may transmit and receive an Email, browse a webpage and access a streaming media through the wireless communication unit 170. The wireless communication unit 170 may provide the user with an access to a wireless broadband internet. Though the wireless communication unit 170 is shown in FIG. 4, in a particular application, the UE 400 may not include the wireless communication unit 170.

The processor 180 is a control center of the UE 400. The processor 180 is connected with all components of the mobile phone via various interfaces and circuits, and may implement various functions and data processing of the UE 400 through operating or executing the software programs and/or modules stored in the storage 120 and calling data stored in the storage 120, thereby overall monitoring the UE 400. The processor 180 may include one or more processing units. The processor 180 may include an application processor and a modem processor. The application processor may process an operation system, a user interface and application programs. The modem processor may process wireless communication. It can be understand that the above processor 180 may also not include the modem processor.

The power 190 may be connected with the processor 180 through a power management system, so as to manage such functions as charging, a discharging and power consumption through the power management system. The power 190 may also include one or more Direct Current (DC) or Alternating Current (AC) powers, a recharging system, a power failure detection circuit, a power converter or an inverter, a power status indicator etc.

The UE 400 may further include a camera and a bluetooth module, which is not shown in FIG. 4. In the embodiments of the present invention, the displaying unit of the sending apparatus is a touch screen display. One or more programs are stored in the storage 120, and are configured to be executed by the one or more processors 180. The one or more programs include instructions for performing following operations.

After the UE entering an RRC_Connected state and when a trunked called service is operated on the UE, the UE informs a base station of a trunked service attribute.

Figure 5:
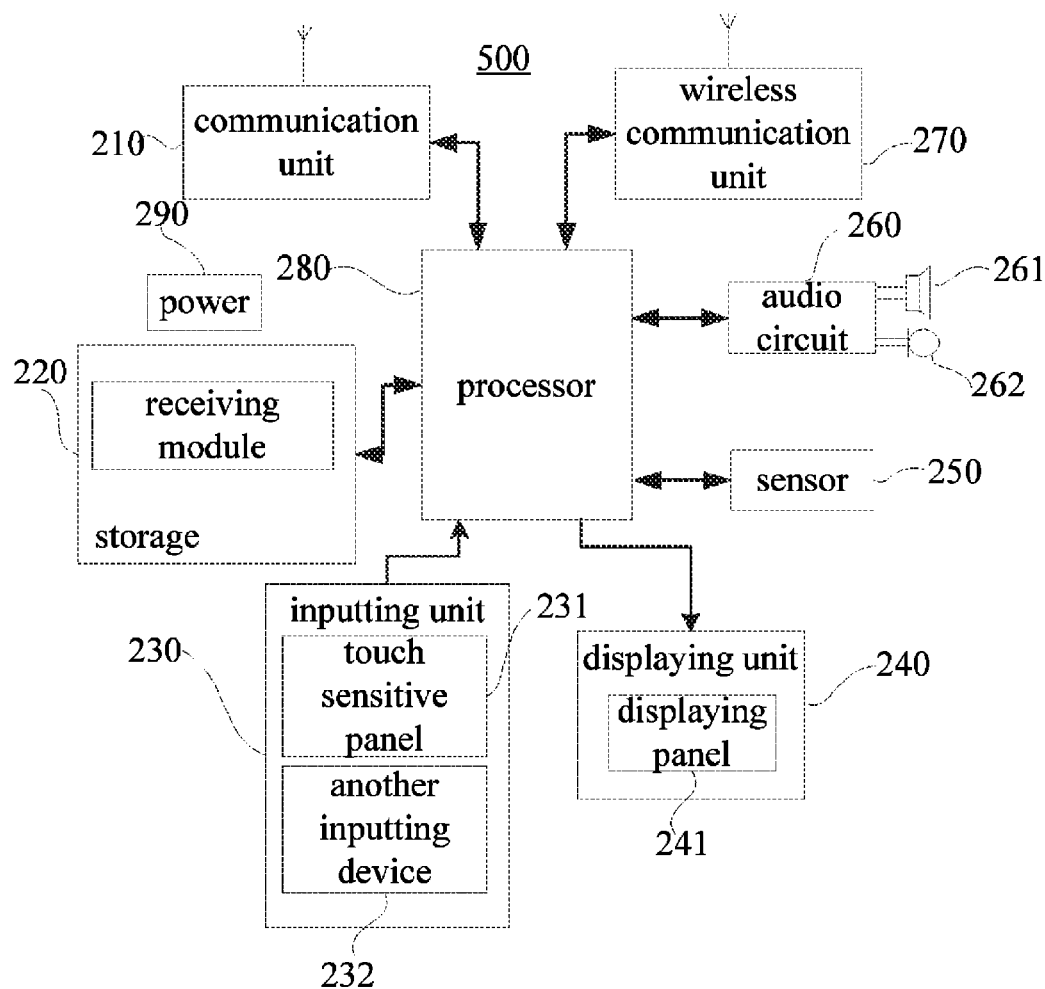
FIG. 5 is a diagram illustrating the structure of a base station for processing a trunked service attribute according to some embodiments of the present invention.

FIG. 5 is a diagram illustrating the structure of a base station for processing a trunked service attribute according to some embodiments of the present invention. The base station 500 may include a communication unit 210, one or more non-transitory storages 220 used as a computer readable storage medium, an inputting unit 230, a displaying unit 240, a sensor 250, an audio circuit 260, a wireless communication unit 270, one or more processors 280 and a power 290.

The inputting unit 230 may include a touch sensitive panel 231 and another inputting device 232. The displaying unit 240 may include a displaying panel 241. The audio circuit 260 may include a speaker 261 and a microphone 262.

The communication unit 210, the storage 220, the inputting unit 230, the displaying unit 240, the sensor 250, the audio circuit 260, the wireless communication unit 270, the one or more processors 280, the power 290, the touch sensitive surface 231, another inputting device 232, the displaying panel 241, the speaker 261 and the microphone 262 are respectively the same as the above communication unit 110, the storage 120, the inputting unit 130, the displaying unit 140, the sensor 150, the audio circuit 160, the wireless communication unit 170, the one or more processors 180, the power 190, the touch sensitive surface 131, another inputting device 132, the displaying panel 141, the speaker 161 and the microphone 162, which are not described repeatedly herein.

The storage 220 includes a receiving module 280, which is configured to be executed by the one or more processors 280. The one or more programs include instructions for performing following operations:

receiving a message containing a trunked service attribute reported by a UE, and obtaining the trunked service attribute of the UE.

By the present invention, it can be learned whether a trunked called service is operated on a UE entering an RRC_Connected state in a cell even if air interface signalings at a base station side are not increased, so that the base station is able to accurately know which UEs can receive the group call in the cell.

What is described in the foregoing are only partial embodiments of the present disclosure, but are not all embodiments. Any modification, equivalent substitution and improvement without departing from the spirit and principle of the present invention are within the protection scope of the present invention.

what is claimed is:

1. A method for processing a trunked service attribute, the method comprising:

after a User Equipment (UE) enters a Radio Resource Control Connected (RRC_Connected) state and when a trunked called service is operated on the UE, informing, by the UE, a base station of a trunked service attribute, wherein the trunked service attribute comprises a Group Radio Network Temporary Identifier (G-RNTI);

wherein informing, by the UE, the base station of the trunked service attribute comprises:

informing, by the UE, the base station of the G-RNTI through one of a G-RNTI Media Access Control (MAC) Control Element (CE) and a Cell Radio Network Temporary Identifier (C-RNTI) MAC CE.

2. The method of claim 1, wherein informing, by the UE, the base station of the G-RNTI through the G-RNTI MAC CE comprises:

when the UE is in the RRC_Connected state in an uplink Transmit Time Interval (TTI), reporting, by the UE, the G-RNTI to the base station through the G-RNTI MAC CE.

3. The method of claim 1, wherein informing, by the UE, the base station of the G-RNTI through the C-RNTI MAC CE comprises:

when the UE is in the RRC_Connected state in an uplink TTI and has no C-RNTI to be reported, reporting, by the UE, the G-RNTI to the base station through the C-RNTI MAC CE.

4. The method of claim 1, wherein informing, by the UE, the base station of the G-RNTI through the C-RNTI MAC CE comprises:

when the UE is in the RRC_Connected state in an uplink TTI and has at least one C-RNTI to be reported, reporting, by the UE, the at least one C-RNTI to the base station through the C-RNTI MAC CE; and after the at least one C-RNTI has been reported to the base station, reporting, by the UE, the G-RNTI to the base station through the C-RNTI MAC CE.

5. A User Equipment (UE) for processing a trunked service attribute, the UE comprising at least one processor and at least one non-transitory storage, wherein the at least one non-transitory storage stores one or more computer readable instructions that when executed by the at least one processor cause the at least one processor:

to, after the UE enters a Radio Resource Control Connected (RRC_Connected) state and when a trunked called service is operated on the UE, inform a base station of a trunked service attribute, wherein the trunked service attribute comprises a Group Radio Network Temporary Identifier (G-RNTI); and to, when the trunked service attribute comprises the G-RNTI, inform the base station of the G-RNTI through one of a G-RNTI Media Access Control (MAC) Control Element (CE) and a Cell Radio Network Temporary Identifier (C-RNTI) MAC CE.

6. The UE of claim 5, wherein the one or more computer readable instructions when executed by the at least one processor cause the at least one processor to, when the UE is in the RRC_Connected state in an uplink Transmit Time Interval (TTI), report the G-RNTI to the base station through the G-RNTI MAC CE.

7. The UE of claim 5, wherein the one or more computer readable instructions when executed by the at least one processor cause the at least one processor to, when the UE is in the RRC_Connected state in an uplink TTI and has at least one C-RNTI to be reported, report the at least one C-RNTI to the base station through the C-RNTI MAC CE; and to, after the at least one C-RNTI has been reported to the base station, report the G-RNTI to the base station through the C-RNTI MAC CE.

8. The UE of claim 5, wherein the one or more computer readable instructions when executed by the at least one processor cause the at least one processor to, when the UE is in the RRC_Connected state in an uplink TTI and has no C-RNTI to be reported, report the G-RNTI to the base station through the C-RNTI MAC CE.

* * * * *